United States Patent [19]

Hilmersson et al.

[11] Patent Number: 4,698,514
[45] Date of Patent: Oct. 6, 1987

[54] METHOD AND AN ARRANGEMENT FOR THE DETECTION BY PHOTOELECTRIC MEANS OF MARKINGS MADE ON A TRAVELLING MATERIAL WEB PROVIDED WITH PRINTED DECORATION

[75] Inventors: Anders E. Hilmersson, Eksjögatan; Istvan M. Ulvros, Baldersvägen, both of Sweden

[73] Assignee: Tetra Pak International AB, Lund, Sweden

[21] Appl. No.: 628,661

[22] Filed: Jul. 6, 1984

[30] Foreign Application Priority Data

Jul. 6, 1983 [SE] Sweden ................. 8303845

[51] Int. Cl.⁴ ............................. B65H 25/24
[52] U.S. Cl. .................... 250/566; 235/456; 250/548
[58] Field of Search .............. 250/566, 568, 548, 557, 250/559, 571; 226/45; 235/466, 456; 356/400, 401, 429

[56] References Cited

U.S. PATENT DOCUMENTS

| 3,562,494 | 2/1971 | Schmidt | 235/466 |
| 3,783,293 | 1/1974 | Gold et al. | 250/548 |
| 3,796,862 | 3/1974 | Asija | 250/557 |
| 3,922,539 | 11/1975 | Carnes et al. | 250/568 |
| 4,515,481 | 5/1985 | Yamada et al. | 356/400 |
| 4,600,841 | 7/1986 | Tokuno et al. | 250/548 |

Primary Examiner—Edward P. Westin
Assistant Examiner—Charles F. Wieland
Attorney, Agent, or Firm—Burns, Doane, Swecker & Mathis

[57] ABSTRACT

A method and an arrangement is disclosed for the detection by photoelectric means of markings made on a printed, decorated material web. The markings comprise two groups of stroke markings, the markings of a first group being arranged to be sensed by a first photocell element, which, on sensing the first group markings causes the output of a second photocell element, which senses the stroke markings of a second group of making to be fed into a memory unit for continuous comparison with a stored value. In response to the comparison, a control signal is generated to control the performance of various operations on the web.

12 Claims, 2 Drawing Figures

METHOD AND AN ARRANGEMENT FOR THE DETECTION BY PHOTOELECTRIC MEANS OF MARKINGS MADE ON A TRAVELLING MATERIAL WEB PROVIDED WITH PRINTED DECORATION

The present invention relates to a method for the detection by photoelectric means of markings made on a travelling material web provided with printed decoration together with control means and an arrangement for the realization of the method.

BACKGROUND OF THE INVENTION

It is customary, for example, in the technology of printing and packaging, to control processing operations on a travelling material web by providing printing control marks on the web which can be sensed by photocells or other optical devices.

These markings or control marks are most frequently printed in a colour tone such as black which contrasts with the surroundings, and they are applied on such zones of the material web where no other printed markings or patterns are present. The markings can also be made with magnetically sensible material or with the help of marks sensible by mechanical means, e.g. holes, crease lines, slots, etc.

These control marks are used e.g. in multicolour printing to adapt the position of the patterns printed in different colours to one another so that the different colour patterns come to lie accurately on top of one another. A second, similar usage, where it is intended to add print to a previously preprinted material web at a certain point in the printing pattern, e.g. a date marking or the like, or where it is intended to arrange a printed pattern and a crease line pattern facilitating the folding in register with each other. Further fields of application exist, for example, where a packing material web is to be advanced in a packing machine or the like over exactly the length of a pattern so as to obtain, on the one hand, the printed pattern in the same position on all packages, and to ensure, on the other hand, that the crease line pattern coincides with the forming device of the packaging machine so that the folding of the material takes place along the crease lines which are predetermined in their position.

As mentioned previously, it has been necessary up to now either to provide the web with a longitudinal blank band which may only contain control markings or else it has been necessary, in each case, to place the control markings in a relatively large blank zone, the photocell device being activated only when it is certain that the area with the zone or "window" has been reached.

Such blank bands or zones naturally disturb the general picture of the design and it is desirable, therefore, to accommodate the control markings within the existing design or on very small blank surfaces which, in principle, only comprise the control markings. However, this has given rise to great problems since the elements adapted to sense the markings respond to parts of the design as well as control marks, with the consequence that undesired adjustments or processing operations are carried out following the detection of "false signals."

SUMMARY OF THE INVENTION

The generation of such false signals is prevented, however, by the method of the present invention which provides control markings which consist of two groups of stroke markings, the markings of one group being arranged to be sensed by a first detector element which, on detection of a marking, causes the output of a second detector element to be stored. The second detector is equipped to detect and sense a second group of stroke markings, the result of the sensing is then compared with a value or a sequence of pulses stored in a memory and, depending on the outcome of the comparison, a control signal or a pulse is emitted for the control or initiation of processing operations which are carried out on or with the web.

DESCRIPTION OF THE DRAWING

A preferred embodiment of the present invention will be described in the following detailed description with reference to the accompanying drawing, wherein.

DESCRIPTION OF THE PREFERRED EMBODIMENT

Figure 1:
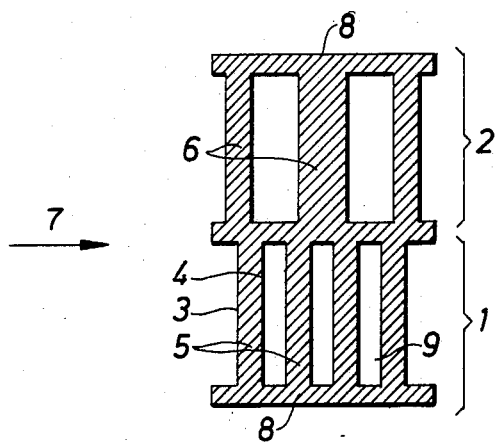
FIG. 1 illustrates a control marking in accordance with the invention.

The control markings shown in FIG. 1 consist of two groups of markings, designated groups 1 and 2. In the case shown here, group 1 consists of four parallel zones or bars 5 arranged at mutually equal distances from one another and printed in dark colour. The number of zones and their mutual placing may be varied, practically speaking, in an arbitrary manner, but it has been found appropriate in practice to arrange the linear marking zones 5 in group 1 in the manner as shown in FIG. 1. In the case described here, the width of the zones 5 and of the gaps 9 between the zones 5 is equal. This means that the front edge 3 and the rear edge 4, respectively, of the zones 5 will cause the detector I to generate a succession of signals or pulses 13, emitted at equal intervals, in the form of a pulse train I if the web is led past the detector element I at uniform speed in the direction of arrow 7 in FIG. 1. The detector element I detects transitions from light to dark colour (and vice versa) and, each time such a transition is detected, the state of before "emitted" an output signal emitted from the detector element I changes accordingly. The pulse train 13 (FIG. 2) emitted by the detector element I will be, as mentioned above, in the case described here at a uniform frequency if the web provided with control marks is led past the detector element I at a constant speed. This does not necessarily have to be the case, as mentioned before, and the arrangement functions equally well if the pulses 13 emitted from the detector element I have an arbitrary mutual frequency sequence.

Figure 2:
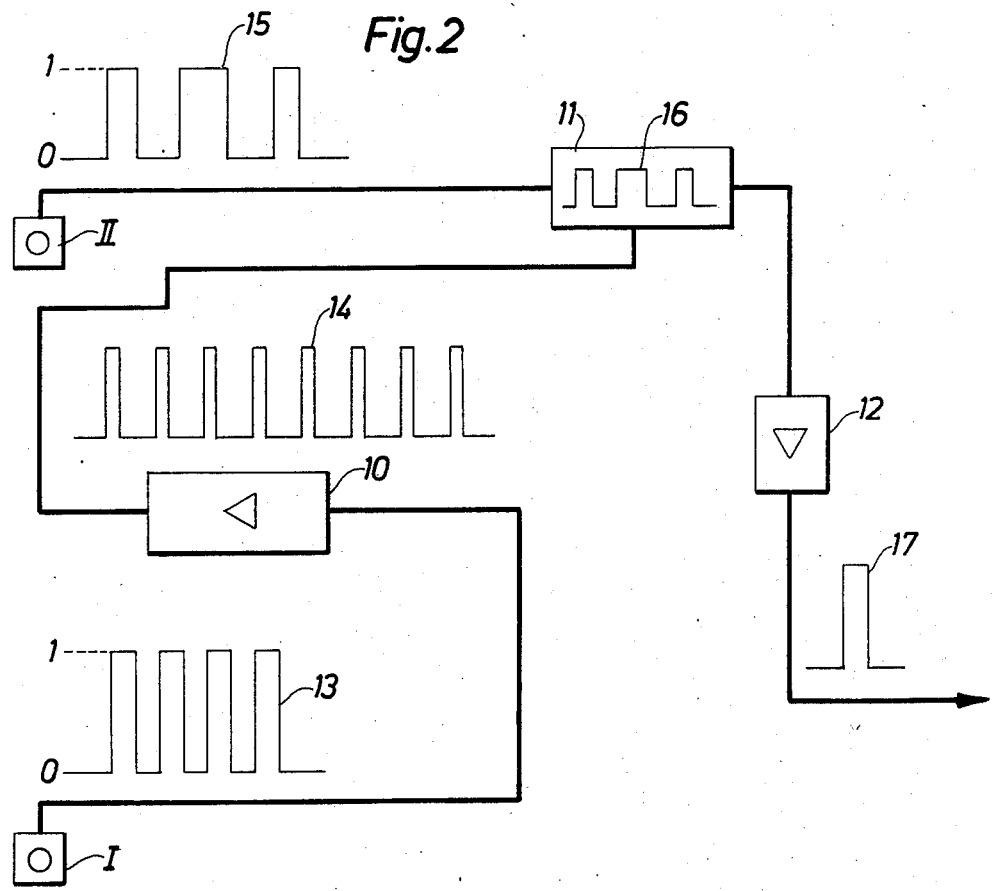
FIG. 2 is a block diagram for a control arrangement.

In FIG. 2, it is assumed that the pulses in the pulse train 13 have the value 0 or 1, the value 0 being obtained when "light background area" is registered by the detector I, whilst the value 1 is obtained when "dark background area" is detected. The pulses 13 are amplified in an operational amplifier 10 and converted to a pulse train 14, wherein each transition between the values 0 and 1 in the pulse train 13 is converted to a pulse of a pulse duration chosen for the specific case. Each pulse in pulse train 14 should be sufficiently long to enable proper sampling of the output of the detector element II by a processor 11 and for the secure sensing of the marking group 2. As described below in greater detail, the processor 11 preferably includes a shift register, a comparator and a memory.

At each "colour tone transition" detected, the current output of the detector element II is sampled by a register and thus the markings 6 of the second group 2, which, at the instant of sampling, are under the detector element II, are sensed. In the preferred embodiment, the detector element II emits a signal in case the dark zone has been detected but no signal if the light zone has been detected. It is also possible to use the reverse indication procedure where the detector emits a signal in response to a light zone and no signal in response to a dark zone. This means that the sensing of the output from the detector element II is controlled by the markings of the first group 1, which is usually characterized as the sampling pulse generator or "clock," and that the detector element II via an amplifier, e.g. an operational amplifier, generates a "pulse train" 15, that is to say, a series of pulses with interruptions corresponding to the parts where only light colour has been detected. If it is assumed that the detection of dark colour results in a pulse which can be designated 1 and the detection of light colour results in a missing pulse which can be designated 0, a pulse train 15 (e.g. 10 01 10 01), which in the present case comprises eight pulse divisions, will be recorded since the marking of the first group, which acts as a "clock," consists of four coloured zones, which gives eight colour transitions from dark zone to light zone and vice versa. The eight samples of the pulse train 15 can be recorded in a memory or shift register of processor 11 and compared with a value or pulse code 16 stored in a second memory or a comparator of the processor. The set of stored samples of the pulse train 15 generated by the detector element II is compared by the comparator with the reference pulse train or pulse code 16 stored in the processor 11. In the event of total agreement, a signal 17 is generated as the last colour transition is recorded in the marking group I. The signal 17 can be used for starting the processing operations on the web, e.g. printing, punching of holes or adjustment of position of the web.

For a secure detection, the second marking group 2 should be located so that it never coincides "edge in edge" with the markings of the first group 1. It must be ensured instead that the edge regions of the markings of the first group 1 are encountered by a zone 6 "free of edge region" on the markings of the second group 2. For the rest, the markings 6 of the second group 2 may be arranged arbitrarily and in such a manner that an arbitrarily selectable pulse train is obtained from the detector element II. Naturally, this pulse train 15, must have a recorded counterpart in the memory unit of the processor 11 so that a detection of and "approval of legitimate marking" should be feasible.

If difficulties arise due to the detector element 2 being in the vicinity of the edge region of one of zones 6 in marking group 2 as the processor receives the sampling pulse, e.g. because the control marking during the printing has been slightly shifted in its position owing to the compression of the rubber printing blocks, which is common in rubber block printing, a compensation can be made by displacing the detector element II in the longitudinal direction of the web with the help of a screw or the like.

In one application of the arrangement, a packing material web printed in advance is used that contains a large amount of advertising and informative text which forms a large number of more or less distinct transitions between light and dark parts. The packing material web is also provided with a control marking which, in accordance with the invention, consists of two groups 1 and 2 of marking zones 5 and 6. These zones are connected to one another by narrow zones 8 arranged in the longitudinal direction of the web. The zones 8 ensure that the parts of the block which produce the zones should act in a stiffening manner upon the zones 5 and 6, especially when the printing is done with rubber blocks which, as mentioned previously, have a tendency to become deformed when they are pressed against a printing slab. This deformation tendency is reduced, however, by the connecting elements 8 which maintain constant the mutual distance between zones 5 and 6.

When the printed packing material web provided with control markings 1 and 2 is introduced into the packing machine and is driven through the same, a narrow area of the web will be continuously sensed or scanned for the occurrence of light and dark parts by two detector elements I, II which may be arranged side by side or behind each other at a certain distance. If one detector is arranged behind the other, the marking groups 1 and 2 must be similarly arranged with the distance between the marking groups corresponding to the distance between the detector elements I and II.

When the material web is led past the detector element I, pulses 13 are generated as the transition from parts with darker or lighter colour tone is detected, and these pulses are amplified, in the manner described earlier, to form a pulse train 14, which controls the sampling the output of the detector element II. The output of the detector element II, when sampled by the register in response to a pulse from the detector element I, senses whether the part of the material web which is present underneath the sensing unit or photocell has a dark or light colour tone. The processor 11 also contains a comparator, that is, a memory unit for pulses with a certain programmable pulse sequence. The processor 11 receives samples from a pulse train 15 continuously in accordance with the sensing of the design of the packing material. If, in any part of the pulse train 15, the sampled pulse sequence is the same as the pulse sequence stored in the processor 11, then an output signal 17 is emitted when the last pulse in the correct pulse sequence is recorded. This signal 17 may be amplified in the amplifier 12 to control a subsequent operational procedure.

Practical trials have shown that it is quite sufficient, in most cases, to have four dark-coloured zones 5 in the markings of the first group 1 which cause the output of the detector element II to be sampled eight times and thus generate a set of samples of the pulse train which has a certain combination each time the control marking groups 1 and 2 pass the detector element I and II. Between recordings of the control marking groups 1 and 2, pulses are also generated by the transitions between darker and lighter parts in the design of the packing material web. These pulses are fed into the processor 11 and are compared with the combination stored in the comparator, but the likelihood that the design present will produce a pulse train 15 of the "correct" combination is very small and practically negligible. If it is desired, for any reason, to ensure improved safety of sensing, it is possible to have five coloured zones 5 instead of four in the control marking group 1. This will cause the output of the detector element to be sampled ten times i.e. there will be ten "clock pulses" and samples from the detector element II (and thus a correct pulse train will contain ten pulse units instead of eight). In the same manner, it is possible to use fewer than four coloured zones in the control marking group 1 in cases where the web material design is simpler and does not contain many colour elements in a complicated arrangement.

It has proved advantageous in practice for the pulse train to be initiated with the sensing of a dark coloured zone, but this is not absolutely necessary. The number of bar markings 6 of the second marking group 2 can be equal to, or fewer than, the number of bar markings of the first control markings group 1. In general, the number of coloured zones 6 in the second control markings group 2 is lower than in the control markings group 1 owing to the chosen combination of pulses in the detected pulse train often comprising two or more "zero pulses or one pulses" side by side, which means that these pulses are represented in the marking group 2 by a broader coloured or uncoloured zone.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

We claim:

1. A method for controlling an operation on a moving patterned web in accordance with a first marking group and a second marking group provided on said patterned web, comprising the steps of:
   producing a continuous output signal related to the web pattern adjacent a first detector means while said web is moved along a predetermined path,
   creating a continuous stream of sampling pulses from the output of said first detector means,
   producing a continuous output signal related to the web pattern adjacent a second detector means while said web is moved along said predetermined path,
   sampling the output of said second detector means with a register means in response to said sampling pulses, said sampling pulses controlling times at which samples of said output of the second detector means are recorded in said register,
   comparing a set of said samples of the output of said second detector with a reference pulse code corresponding to a set of stored values representative of a desired register means contents in order to determine whether the patterns passing adjacent said first detection means and said second detection means are said first marking group and said second marking group, respectively, and
   generating a control signal for controlling operations on the moving web in response to said generated control signal when said set of samples in said register means corresponds to the set of stored values.

2. The method of claim 1, wherein said first and second marking groups each comprise a plurality of parallel linear bar markings, said linear bar markings being substantially perpendicular to the direction of travel of said moving web and being arranged such that the edges of the individual bar markings of said first marking group pass said first detector at a time different than the time at which the edges of the individual bar markings of said second marking group pass the second detector.

3. The method of claim 2, wherein the number of bar markings in said first group is at least equal to the number of markings in said second group.

4. The method of claim 2, wherein the bar markings in said first group are of a uniform width and at a uniform distance between one another.

5. The method of claim 4, wherein the number of bar markings in said first group is at least equal to the number of bar markings in said second group.

6. The method of claim 2, wherein the parallel bar markings of said first group and second group are connected along their ends by a bar zone which is perpendicular to said parallel bar markings.

7. The method of claim 1, wherein said creating step includes generating sampling pulses in response to the detection of light intensity changes of the web pattern adjacent said first detection means, said sampling pulses controlling the times at which the output of said second detector means is recorded in said register.

8. The method of claim 7, wherein said first and second marking groups each comprise a plurality of substantially parallel linear bar markings, said linear bar markings being substantially perpendicular to the direction of travel of said moving web and being arranged such that the edges of the individual bar markings of said first marking group pass said first detector at a time different than the time at which the edges of the individual bar markings of said second marking group pass said second detector.

9. The method of claim 8, wherein the number of linear bar markings in said first group is at least equal to the number of linear bar markings in said second group.

10. The method of claim 8, wherein the individual linear bar markings in said first group are of a uniform width and are spaced from one another by a uniform distance.

11. The method of claim 10, wherein the number of linear bar markings in said first group is at least equal to the number of linear bar markings in said second group.

12. The method of claim 8, wherein the ends of said parallel bar markings of said first marking group are connected to the ends of said parallel bar markings of said second marking group by a bar zone which is perpendicular to said parallel bar markings.

* * * * *